US011321622B2

United States Patent
Park et al.

(10) Patent No.: US 11,321,622 B2
(45) Date of Patent: May 3, 2022

(54) TERMINAL DEVICE FOR GENERATING USER BEHAVIOR DATA, METHOD FOR GENERATING USER BEHAVIOR DATA AND RECORDING MEDIUM

(71) Applicant: FOUNDATION OF SOONGSIL UNIVERSITY INDUSTRY COOPERATION, Seoul (KR)

(72) Inventors: Young Tack Park, Seoul (KR); Myung Joong Jeon, Seoul (KR); Seok Hyun Bae, Seoul (KR); Je Min Kim, Seoul (KR); Hyun Kyu Park, Seoul (KR); Sung Hyuk Bang, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 748 days.

(21) Appl. No.: 16/170,460

(22) Filed: Oct. 25, 2018

(65) Prior Publication Data
US 2019/0138925 A1    May 9, 2019

(30) Foreign Application Priority Data
Nov. 9, 2017   (KR) .......................... 10-2017-0148427

(51) Int. Cl.
*G06F 3/048*  (2013.01)
*G06N 7/00*   (2006.01)
(Continued)

(52) U.S. Cl.
CPC ............. *G06N 7/005* (2013.01); *G06F 3/011* (2013.01); *G06N 20/00* (2019.01)

(58) Field of Classification Search
CPC ........ G06N 7/005; G06N 20/00; G06N 3/006; G06N 5/003; G06F 3/011; G06F 17/18;
(Continued)

(56) References Cited

U.S. PATENT DOCUMENTS 7,285,090 B2 * 10/2007 Stivoric ............... A61B 5/4866
600/300
8,170,960 B1 *  5/2012 Bill ....................... H04L 12/282
706/11
(Continued)

FOREIGN PATENT DOCUMENTS

JP     2012-022530 A     2/2012
WO    WO-2017039140 A1 *  3/2017 ............ H04W 4/023

OTHER PUBLICATIONS

Korean Office Action dated Jun. 29, 2019, in connection with counterpart Korean Patent Application No. 10-2017-0148427, citing the above reference.

*Primary Examiner* — Steven B Theriault
(74) *Attorney, Agent, or Firm* — Hauptman Ham, LLP (57) ABSTRACT

A terminal device for generating user behavior data, a method for generating user behavior data, and a recording medium are provided. The disclosed terminal device may include a memory unit storing instructions readable by a computer; and a processor unit implemented to execute the instructions, where the processor unit may compute a probability distribution model for achieving the intentions of a user by using raw data related to time-dependent actions of the user and may generate user behavior data by using the probability distribution model, with the user behavior data comprising time series data in which multiple actions composing the intentions of the user are aligned in order.

9 Claims, 9 Drawing Sheets

(51) Int. Cl.
*G06F 3/01* (2006.01)
*G06N 20/00* (2019.01)

(58) Field of Classification Search
CPC ... A61B 5/1118; A61B 5/6803; A61B 5/7267;
A61B 5/165; A61B 5/7264; A61B
5/7282; A61B 5/1112; A61B 5/0002;
A61B 5/1123; A61B 2562/0219; A61B
5/742
See application file for complete search history.

(56) References Cited

U.S. PATENT DOCUMENTS

| | | | | |
|---|---|---|---|---|
| 9,019,278 | B2* | 4/2015 | Hodgins | G06T 13/40 |
| | | | | 345/473 |
| 9,152,529 | B2* | 10/2015 | George | G06F 11/3438 |
| 9,219,668 | B2* | 12/2015 | Johnson | H04W 4/029 |
| 9,687,180 | B1* | 6/2017 | Deninger | G01S 19/42 |
| 9,750,433 | B2* | 9/2017 | Hu | A61B 5/6824 |
| 10,482,482 | B2* | 11/2019 | Bilenko | G06N 20/00 |
| 10,578,451 | B2* | 3/2020 | Panahandeh | G01C 21/3484 |
| 10,983,945 | B2* | 4/2021 | Molettiere | G16H 10/60 |
| 2002/0087289 | A1* | 7/2002 | Halabieh | G06F 9/451 |
| | | | | 702/181 |
| 2007/0073477 | A1* | 3/2007 | Krumm | G01C 21/3617 |
| | | | | 701/423 |
| 2008/0170123 | A1* | 7/2008 | Albertson | A63B 24/0006 |
| | | | | 348/157 |
| 2009/0054043 | A1* | 2/2009 | Hamilton | H04W 4/21 |
| | | | | 455/414.2 |
| 2011/0202864 | A1* | 8/2011 | Hirsch | G06F 3/0482 |
| | | | | 715/773 |
| 2011/0302116 | A1* | 12/2011 | Ide | G01C 21/3484 |
| | | | | 706/12 |
| 2012/0102304 | A1* | 4/2012 | Brave | G06F 16/9535 |
| | | | | 713/1 |
| 2012/0136817 | A1* | 5/2012 | Chai | G06T 13/40 |
| | | | | 706/12 |
| 2013/0345967 | A1* | 12/2013 | Pakzad | G01C 21/005 |
| | | | | 701/431 |
| 2015/0002808 | A1* | 1/2015 | Rizzo, III | G02C 11/10 |
| | | | | 351/158 |
| 2015/0004998 | A1* | 1/2015 | Pennanen | H04W 64/00 |
| | | | | 455/456.1 |
| 2015/0310656 | A1* | 10/2015 | Otto | G06T 13/40 |
| | | | | 345/420 |
| 2015/0330805 | A1* | 11/2015 | Cho | G01C 21/3484 |
| | | | | 701/428 |
| 2017/0295469 | A1* | 10/2017 | Moon | H04W 4/029 |
| 2018/0197099 | A1* | 7/2018 | Liang | G06N 7/005 |
| 2018/0249435 | A1* | 8/2018 | Yu | H04W 4/023 |

\* cited by examiner

Data format: S_ID/tine/Person_ID/Activity/Pose/Location

```
0, 7 h 01 min, 1, Walking, Standing, Room 2
1, 7 h 02 min, 1, Walking, Standing, Room 2
...
3, 7 h 04 min, 1, Walking, Standing, Room 2 Entrance
4, 7 h 05 min, 1, Walking, Standing, Kitchen
...
15, 7 h 16 min, 1, Cutting Ingredients, Standing, Kitchen
16, 7 h 17 min, 1, Cutting Ingredients, Standing, Kitchen
17, 7 h 18 min, 1, Cutting Ingredients, Standing, Kitchen
...
33, 7 h 34 min, 1, Eating Food with Spoon/Fork, Sitting on Chair, Kitchen
34, 7 h 35 min, 1, Eating Food with Spoon/Fork, Sitting on Chair, Kitchen
35, 7 h 36 min, 1, Eating Food with Spoon/Fork, Sitting on Chair, Kitchen
36, 7 h 37 min, 1, Eating Food with Spoon/Fork, Sitting on Chair, Kitchen
37, 7 h 38 min, 1, Eating Food with Spoon/Fork, Sitting on Chair, Kitchen
...
65, 8 h 6 min, 1, Walking, Standing, Living Room
66, 8 h 7 min, 1, Controlling TV with Remote, Sitting on Sofa, Living Room
67, 8 h 8 min, 1, Controlling TV with Remote, Sitting on Sofa, Living Room
```

FIG. 8B

| Time | | User Info | Main Object | | | | Primitive Action | Location | | |
|---|---|---|---|---|---|---|---|---|---|---|
| Time Step | Hour | User ID | Obj1 | Obj2 | Obj3 | Obj4 | Action | x | y | Room |
| $t_1$ | 7 | 1 | Drawer | Window | ... | Chair | Walk | 287 | 510 | Room2 |
| $t_2$ | 7 | 1 | Album | Flower pot | ... | None | Walk | 290 | 498 | Door(Room2) |
| ... | | | | | | | | | | |
| $t_{3827}$ | 8 | 2 | Spoon | Table | Sink | Dish | Sit | 287 | 504 | Kitchen |

TERMINAL DEVICE FOR GENERATING USER BEHAVIOR DATA, METHOD FOR GENERATING USER BEHAVIOR DATA AND RECORDING MEDIUM

CROSS-REFERENCE TO RELATED APPLICATIONS

This application claims the benefit of Korean Patent Application No. 10-2017-0148427, filed with the Korean Intellectual Property Office on Nov. 9, 2017, the disclosure of which is incorporated herein by reference in its entirety.

BACKGROUND

1. Technical Field

Embodiments of the present invention relate to a terminal device for generating user behavior data, a method for generating user behavior data, and a recording medium that can be used in generating benchmark data, etc., for research associated with creating a machine learning model and statistical analysis.

2. Description of the Related Art

In step with advances in machine learning algorithms for data processing and analysis as well as increases in the standard of hardware technology, studies are being conducted which analyze and predict results for various domain data. Generally, the results of a study are verified by a performance evaluation that utilizes benchmark data. Benchmark data refers to data that is recognized by multiple testers as being suitable for use and serves as an important yardstick in performance comparisons for machine learning models.

There have been many studies in the past on the generation of table data that is not of a time series. Such table data does not entail information related to a time sequence, and one line of data is given one label. Table 1 shows an example of table data that is not of a time series.

TABLE 1

| Interacted Object | Location | Action | Occurrence Intention |
|---|---|---|---|
| Bowl | Kitchen | Sitting | Having a Meal |
| Dining Table | Kitchen | Eating with a Spoon | Having a Meal |
| Oven | Kitchen | Standing | Having a Meal |

Table 1 shows table data associated with the occurrence intention of 'Having a Meal'. In such table data, each of the row instances serves as descriptions that compose the occurrence of the intention occurrence 'Having a Meal'. The table data cannot describe time-flow procedures that compose the occurrence intention 'Having a Meal' but rather compose the intention at just one time point through the captured information. Each set of data in Table 1 may be used as independent information composing one intention, having a meal.

Here, existing data generators generate data corresponding to a fixed time point without considering the time series. However, in the case of data composing a person's intention, consecutive data captured according to the flow of time can include more pattern information compared to data captured at a single time point. While it is also possible to produce good classification patterns by using a sorter to choose attributes useful for data classification without considering the time series, the consideration of a time series is a methodology that is independent of data attribute selection and can be applied in parallel.

SUMMARY OF THE INVENTION

To resolve the problems found in the related art described above, an aspect of the present invention proposes a terminal device for generating user behavior data, a method for generating user behavior data, and a recording medium, which generate user data by applying a time series dimension.

Other objectives of the invention can be derived by the skilled person from the embodiments set forth below.

To achieve the objective above, an embodiment of the invention provides a terminal device that includes a memory unit storing instructions readable by a computer; and a processor unit implemented to execute the instructions, where the processor unit computes a probability distribution model for achieving the intentions of a user by using raw data related to time-dependent actions of the user and generates user behavior data by using the probability distribution model, with the user behavior data comprising time series data in which multiple actions composing the intentions of the user are aligned in order.

The user behavior data can include a multiple number of sub-data sets that are structured such that the multiple actions composing the intentions of the user are aligned in time sequential order, and information included in each of the multiple sub-data sets can include time information, position information of the user, and action information of the user.

Each of the multiple number of actions can be either one type of a first action or a second action, the first action being an action related to a movement between locations where the user is positioned, and the second action being an action for achieving the intention, and each of the intentions can be achieved by performing one or more of the first actions to move between one or more locations and then performing one or more of the second actions at a final location of the one or more locations.

The probability distribution model can include a first probability distribution model and a second probability distribution model, the first probability distribution model corresponding with information on an occurrence probability of the intention with respect to time, and the second probability distribution model corresponding with occurrence information of the one or more second actions with respect to time at the final location.

The processor unit can compute an order of the intentions by using the first probability distribution model, compute a line of movement for each of the intentions according to the computed order of the intentions and compute the one or more first actions related to a movement between one or more locations according to the line of movement, compute the one or more second actions performed at a final location of the line of movement for each of the intentions by using the second probability distribution model, and generate the user behavior data by using the one or more locations associated with the line of movement, the one or more first actions associated with the line of movement, and the one or more second actions at the final location, for all of the intentions.

If the computed order of the intentions does not satisfy a first heuristic rule, then the processor unit can re-compute the order of the intentions, where the first heuristic rule can be a preconfigured rule stating that the computed order of the intentions cannot be regarded as an order of intentions performed by a person.

If the computed one or more second actions do not satisfy a second heuristic rule, then the processor unit can re-compute the one or more second actions, where the second heuristic rule can be a preconfigured rule stating that an order of the two or more second actions cannot be regarded as actions performed by a person.

The processor unit can compute a line of movement for each of the intentions by computing a movement path of an initial location of the line of movement, a final location of the line of movement, and one or more locations following the line of movement.

The process path can compute a movement path of the one or more locations for each of the intentions by using a virtual map having a graph form, where the virtual map can include nodes, which may correspond to locations where the user is positioned, and an edge, which may connect the nodes, and where the edge can be assigned an edge value as a probability of movement from one node to another node.

From among the lines of movement for the intentions, an initial location of an i-th line of movement can correspond to a final location of an (i-1)-th line of movement, and the processor unit can compute a final location of the line of movement for each of the intentions by way of a probabilistic random selection of candidate locations, to which computation probabilities of final locations have been assigned, and can compute a movement path of one or more locations following the line of movement by using the edge values of edges connecting all nodes of the map.

The processor unit can compute the movement path of the one or more locations by a probabilistic random selection of edge values of edges connecting the nodes of the map.

Another embodiment of the invention provides a method for generating user behavior data to be performed at a terminal device that includes a processor unit, where the method can include: computing a probability distribution model for achieving intentions of a user by using raw data related to time-dependent actions of the user; and generating the user behavior data by using the probability distribution model, with the user behavior data including time series data in which a plurality of actions composing the intentions of the user are aligned in order.

Yet another embodiment of the invention provides a recording medium readable by a digital processing device and tangibly embodying a program of instructions that can be executed by a digital processing device for generating user data, where the recording medium has recorded thereon a program for performing a method that includes: computing a probability distribution model for achieving intentions of a user by using raw data related to time-dependent actions of the user; and generating the user behavior data by using the probability distribution model, with the user behavior data including time series data in which a plurality of actions composing the intentions of the user are aligned in order.

A terminal device, method for generating user behavior data, and recording medium based on embodiments of the invention can be used in generating benchmark data, etc., for research associated with creating a machine learning model and statistical analysis.

Also, a terminal device, method for generating user behavior data, and recording medium based on embodiments of the invention can be used as learning data for machine learning-based prediction models associated with behavior patterns and can enable the user to define the amount of data instances and the length of time series required for learning by the machine learning model to the type and number desired by the user.

The advantageous effects of the present invention are not limited to those set forth above but rather encompasses all effects that can be inferred from the composition of the invention disclosed in the detailed description of the invention or the scope of claims.

DETAILED DESCRIPTION OF THE INVENTION

In the present specification, an expression used in the singular encompasses the expression of the plural, unless it has a clearly different meaning in the context. In the present specification, it is to be understood that terms such as "including" or "having," etc., are not to be interpreted as meaning that the various components or the various steps disclosed in the specification must all necessarily be included, but rather should be interpreted as meaning that some of the components or some of the steps may not be included or additional components or steps may further be included. A term such as "unit", "module", etc., in the specification refers to a unit component by which at least one function or action is processed, where such unit component can be implemented as hardware or software or as a combination of hardware and software.

Various embodiments of the invention are described below in further detail, with reference to the accompanying drawings.

Figure 1:
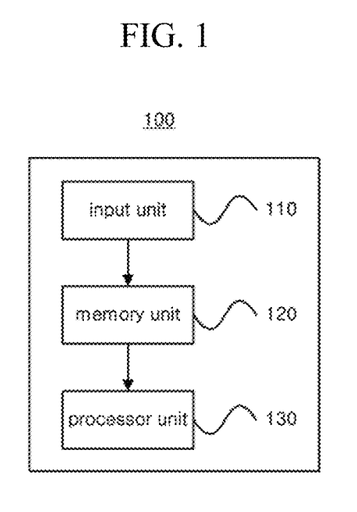
FIG. 1 schematically illustrates the composition of a terminal device according to an embodiment of the invention.

FIG. 1 schematically illustrates the composition of a terminal device according to an embodiment of the invention.

Referring to FIG. 1, a terminal device 100 according to an embodiment of the invention may include an input unit 110, a memory unit 120, and a processor unit 130. The function of each component is described below in further detail.

The input unit 110 may receive raw data as input.

The memory unit 120 can be a volatile and/or non-volatile memory and may store instructions or data related to at least one other component of the terminal device 100. In particular, the memory unit 120 can store instructions or data associated with a program for generating user behavior data of a time series structure.

The processor unit 130 can include one or more of a CPU, an application processor, and a communication processor. For example, the processor unit 130 can perform computations or data processing associated with the control of and/or communication for at least one other component of the terminal device 100. In particular, the processor unit 130 can execute commands associated with running a program.

In the following, the operations of the terminal device 100, performed mainly by the processor unit 130, are described in further detail with reference to FIG. 2 and FIGS. 8A and 8B.

Figure 2:
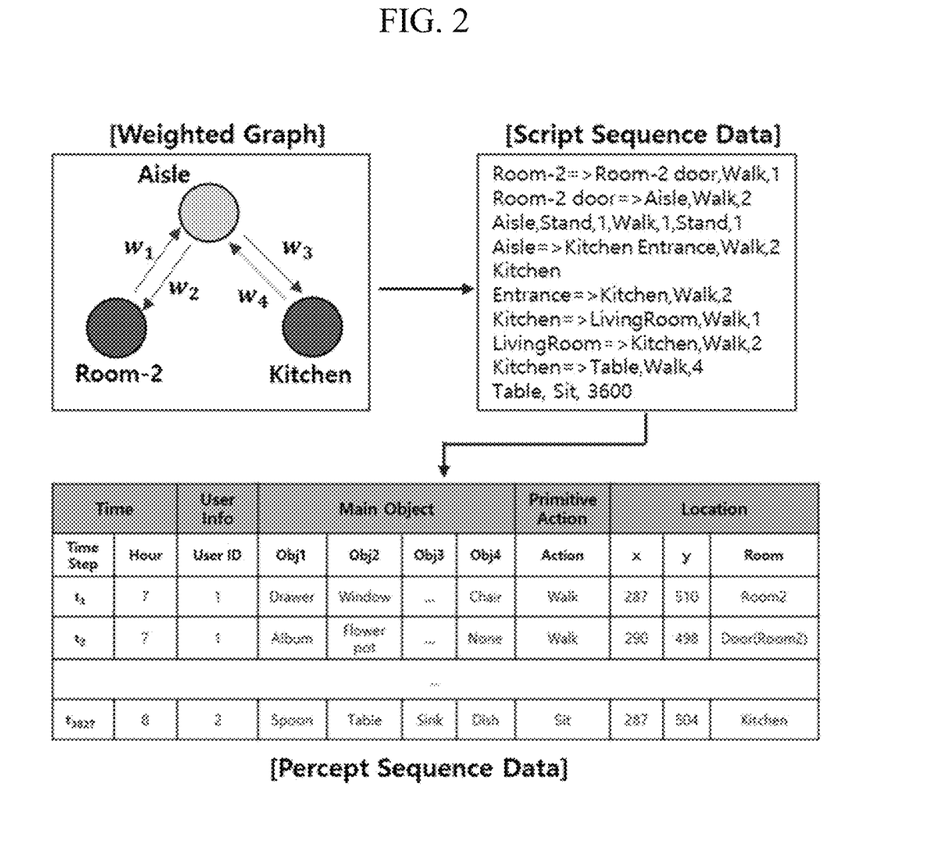
FIG. 2 conceptually illustrates the operations performed in a terminal device according to an embodiment of the invention.

FIG. 2 is a diagram conceptually illustrating the operations performed in a terminal device 100 according to an embodiment of the invention.

Referring to FIG. 2, the user behavior data generated at the terminal device 100 may be perception sequence data and may refer to time series data in a table form associated with behavioral intentions at specific times that is established by way of a probability distribution model (for instance, a Gaussian mixture model) generated using raw data associated with a user's actions.

The user behavior data may include time-wise movement path information and may be information in a time series form generated, based on actual collected activities of the user, by modifying the collected data with position information on a predefined map or drawing to establish a weighted graph structure.

Therefore, the user behavior data ultimately produced may be data in the form of a table that includes multiple sets of sub-data structured such that the multiple actions composing the intentions of the user are aligned in time sequential order, where the multiple sub-data sets can correspond respectively to the rows of the table. A set of sub-data may include time information, information on the position of the user, information on the action of the user, information on the object interacted by the user, and the like.

Here, the terminal device 100 can generate multiple sets of user behavior data through the same action, and the multiple sets of user behavior data can be used as input data for generating a machine learning model that uses behavioral pattern data or as input data for generating benchmark data for research associated with statistical analysis.

Figure 3:
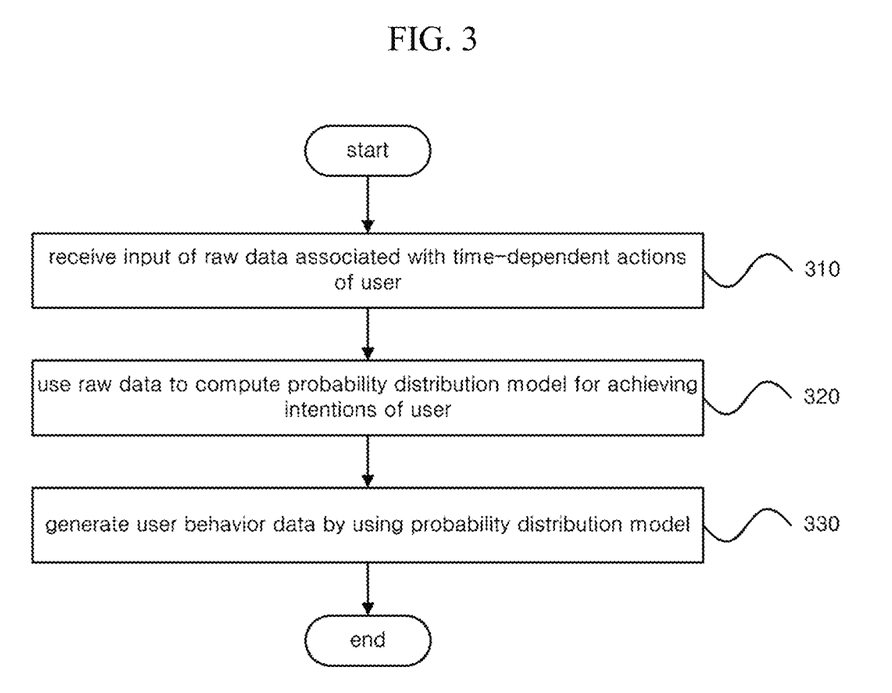
FIG. 3 is a flow diagram of a method for generating user behavior data as operations performed by a terminal device according to an embodiment of the invention.

FIG. 3 is a flow diagram of a method for generating user behavior data as operations performed by a terminal device 100 according to an embodiment of the invention. The function of each component is described below in further detail.

In operation 310, the input unit 110 may receive input of the raw data associated with time-dependent actions of the user.

In operation 320, the processor unit 130 may use the raw data to compute a probability distribution model for achieving the intentions of the user.

Here, an intention refers to an idea or plan that the user wishes to undertake. For instance, a user's intentions can include having a meal, watching TV, cleaning, communicating, reading, etc., which may be performed at home. An intention can be achieved by multiple actions, where each of the multiple actions can be either one type of a first action or a second action.

To be more specific, a first action can be an action associated with movement between the locations where the user is positioned, and a second action can be an action for achieving the intention. Also, an intention can be achieved by performing one or more first actions to move between one or more locations and performing one or more second actions at the final location of the one or more locations.

The probability distribution model can correspond to a first probability distribution model, which may correspond with information on the occurrence probability of intentions with respect to time, and a second probability distribution model, which may correspond with the occurrence information of one or more second actions with respect to time at the final location of the one or more locations for an intention.

Figure 4:
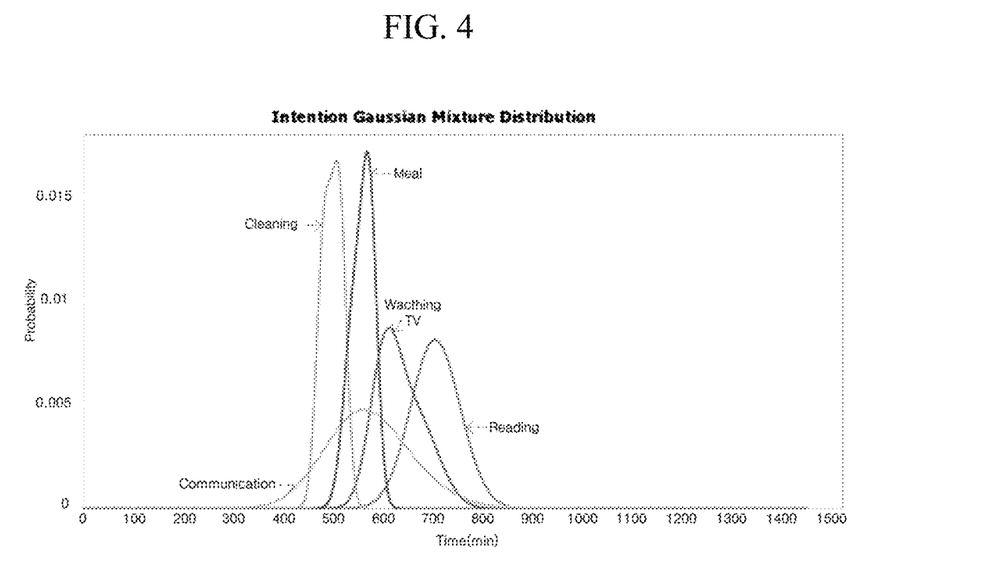
FIG. 4 illustrates an example of a first probability distribution model according to an embodiment of the invention.
Figure 5:
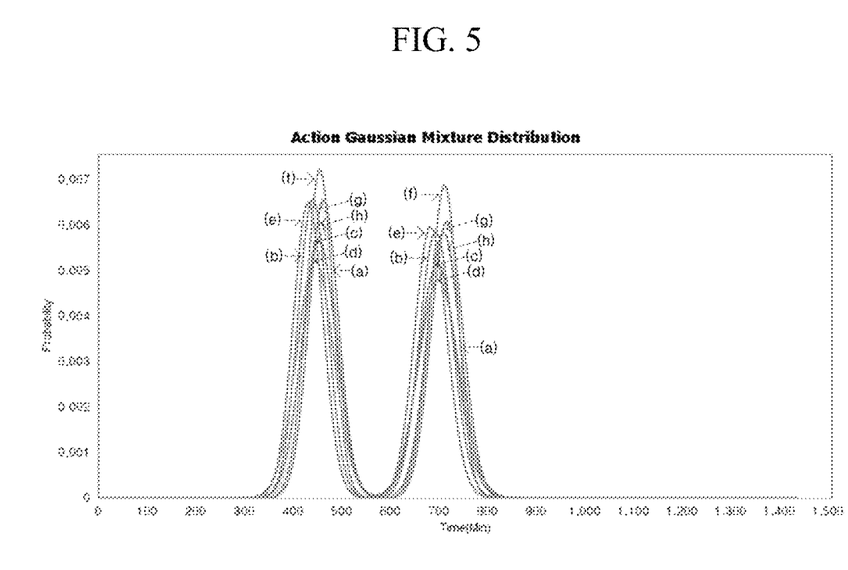
FIG. 5 illustrates an example of a second probability distribution model according to an embodiment of the invention.

FIG. 4 illustrates an example of a first probability distribution model according to an embodiment of the invention, and FIG. 5 illustrates an example of a second probability distribution model according to an embodiment of the invention.

Referring to FIG. 4, the first probability distribution model may be a Gaussian probability distribution model and may represent information on the probability of the multiple intentions, "having a meal, watching TV, cleaning, communicating, and reading", occurring during a preset duration of time. Also, referring to FIG. 5, the second probability distribution model may also be a Gaussian probability distribution model and may represent information on the probability of the multiple second actions, "eating with a spoon/fork (a), cutting food on a cutting board (b), heating food on a stove (c), putting food into/out of a refrigerator (d), preparing bean sprouts/spinach/beans (e), moving (f), pouring a beverage/water into a cup (g), drinking a beverage/water from a cup (h)", occurring at the final location from among multiple locations associated with having a meal during a preset duration of time.

In operation 330, the processor unit 130 may generate user behavior data by using the probability distribution model described above. Here, the user behavior data may be time series data in which the multiple actions composing the intentions of the user are aligned in order, as already described above.

Figure 6:
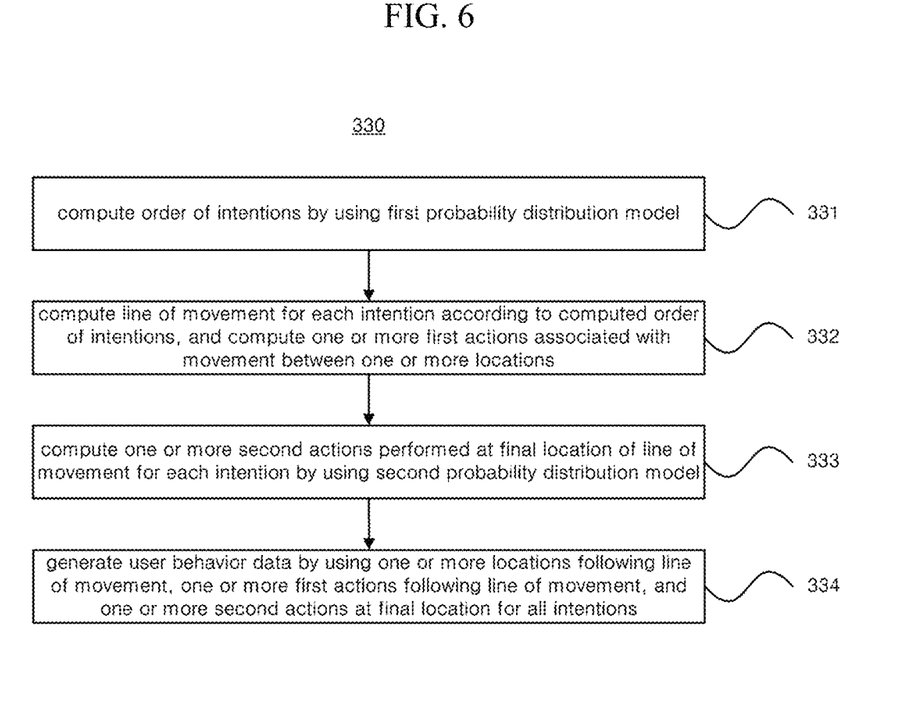
FIG. 6 illustrates the detailed procedures for an operation in a method for generating user behavior data according to an embodiment of the invention.

FIG. 6 illustrates the detailed procedures for operation 330. The operations of the processor unit 130 performed in operation 330 are described in further detail with reference to FIG. 6.

First, in operation 331, the processor unit 130 may use the first probability distribution model to compute the order of the intentions.

Here, the order of the intentions refers to the sequence of the intentions occurring in time sequential order during a preset duration of time. For instance, the order of the intentions of a user located at home during a period from 7 to 13 o'clock can be "having a meal→watching TV→reading→having a meal".

According to an embodiment of the invention, the processor unit 130 can compute an intention at a particular time through a probabilistic random selection based on the probability of intentions occurring at a particular time in the first probability distribution model.

For instance, referring to FIG. 4, the probability value of the intention "cleaning" at time 500 is 0.0155, the probability value of the intention "communicating" is 0.004, and the probability value of the intention "having a meal" is 0.002, and the processor unit 130 can compute the intention for time 500 by way of a probabilistic random selection based on each of the probability values for the intention "cleaning", the intention "communicating", and the intention "having a meal". Such operation can be performed for each particular time unit.

Since it is possible for redundancies and meaningwise contradictions to occur during the computing of the order of the intentions, an embodiment of the invention can define a first heuristic rule to prevent contradictions. Here, the first heuristic rule may be a preset rule stating that the computed order of the intentions cannot be regarded as an order of intentions performed by a person.

For instance, cases in which redundant intentions are connected to occur repeatedly would not satisfy the heuristic rule. Such a case would mean that an intention of a previous step is continuing up to the time point where the redundancy occurs. In this case, the processor unit 130 may delete the redundant entry. For example, if an intention of having a meal occurs at time point $t_1$ and the intention of having a meal occurs again at time point $t_2$, this can be expressed contracted to "having a meal" instead of entering "having a meal→having a meal".

In another example, if there are intentions occurring that are logically contradictory, the processor unit 130 may re-compute the order of the intentions. For example, as in the sequence "having a meal→cleaning→having a meal", if the intention "having a meal" occurs twice within a set time period, this would correspond to a logical contradiction. In this case, the processor unit 130 may re-compute the order of the intentions to compute only an order that does not entail a contradiction.

Next, in operation 332, the processor unit 130 may compute a line of movement for each of the intentions according to the computed order of intentions, and may compute one or more first actions associated with movement between one or more locations according to the line of movement. Here, the first actions may correspond to "walking", "standing", etc.

According to an embodiment of the invention, the processor unit 130 can compute a line of movement for each of the intentions by computing a movement path from an initial location of the line of movement, a final location of the line of movement, and one or more locations on the line of movement. The line of movement for each of the intentions may be computed using the same operation of the processor unit 130, and below, there follows a description of the operation of computing the line of movement for an intention.

The processor unit 130 may first select the final location of the line of movement. Here, the processor unit 130 can search candidate locations that may be suitable for the final location of the line of movement and can compute one of the candidate locations as the final location of the line of movement.

According to an embodiment of the invention, the candidate locations can be assigned probabilities of being computed as the final location, and the processor unit 130 can compute the final location for the line of movement by way of a probabilistic random selection of the candidate locations. For example, for the intention "having a meal", the 'kitchen (60%)', 'living room (20%)', and 'master bedroom (20%)' can be candidate locations, and the processor unit 130 can compute the final location for the line of movement through a probabilistic random selection for 'kitchen (60%)', 'living room (20%)', and 'master bedroom (20%)'.

Afterwards, the processor unit 130 may select the initial location of the line of movement. Here, from among the lines of movement for the intentions, the initial location for the first intention may be selected through a random selection of all locations, and the initial location for an i-th line of movement (where i is an integer greater than or equal to 2) from among the lines of movement for the intentions may correspond to the final location of the (i-1)-th line of movement from among the lines of movement for the intentions. That is, the final location for the first intention may be the initial location for the second intention, the final location for the second intention may be the initial location for the third intention, and the same may apply for all of the other intentions.

Also, the processor unit 130 may compute the movement path for one or more locations composing the line of movement by using a virtual map having the form of a graph together with the information on the initial location and final location.

Figure 7:
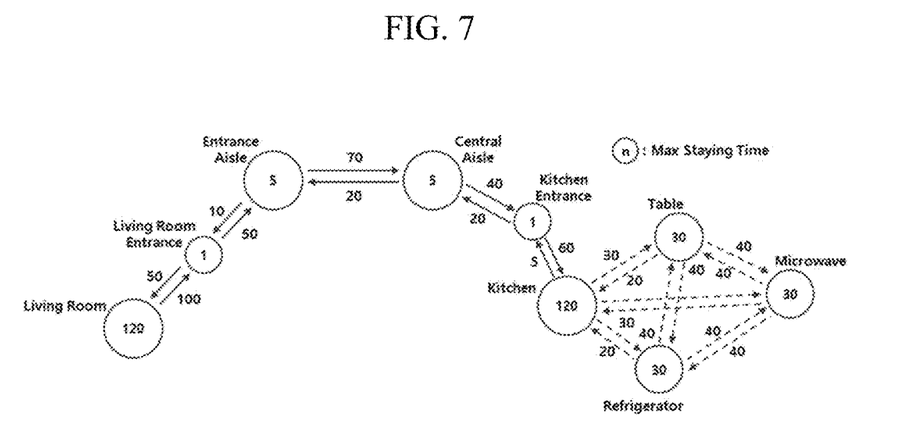
FIG. 7 illustrates an example of a virtual map according to an embodiment of the invention.

FIG. 7 illustrates an example of a virtual map. Referring to FIG. 7, the virtual map may correspond with an actual map and may be composed of nodes, which correspond to locations where the user may be positioned, and edges, which connect the nodes. Here, the edges may be assigned edge values, where an edge value represents the probability of there being a movement from one node to another node. For instance, with respect to the "Living Room Entrance", the probability of movement to the "Living Room" is 50%, and the probability of movement to the "Entrance Aisle" is 50%.

Thus, the processor unit 130 may compute a movement path passing one or more locations for moving from the initial location to the final location. Here, the one or more locations following the line of movement may include the initial location and the final location. The processor unit 130 can compute the movement path for the one or more locations following the line of movement by using edge values of edges connecting all nodes on the map. Here, the processor unit 130 can compute the movement path for the one or more locations by way of a probabilistic random selection of the edge values of edges connecting all nodes on the map.

Continuing with the description, in operation 333, the processor unit 130 may use a second probability distribution model to compute one or more second actions performed at the final location of the line of movement for each of the intentions.

That is, the intention may be performed at the final location, from among the one or more locations composing the line of movement, where the second actions for achieving the intention may be performed at the final location. For instance, to perform the intention of "having a meal", second actions such as eating food with a spoon/fork, putting food into/out of the refrigerator, etc., may be performed at the final location, the "kitchen". Thus, the processor unit 130 may compute one or more second actions that are performed at the final location.

According to an embodiment of the invention, the processor unit 130 can compute a second action at a particular time through a probabilistic random selection for the probabilities of second actions occurring at a particular time in the second probability distribution model.

For instance, referring to FIG. 5, the occurrence probabilities for multiple second actions, "eating food with a spoon/fork, cutting food with a knife on a cutting board, heating food with a stove, putting food into or out of the refrigerator, preparing bean sprouts/spinach/beans, moving, pouring a beverage/water into a cup, drinking a beverage/water from a cup", may be assigned with respect to time within the second probability distribution model, and the processor unit 130 can compute the second action at each time through a probabilistic random selection using each of the multiple second actions. Such operation can be performed according to specific time units.

Since it is possible for redundancies and meaningwise contradictions to occur during the computing of the order of the one or more second actions, an embodiment of the invention can define a second heuristic rule to prevent contradictions in a manner similar to that described above. Here, the second heuristic rule may also be a preset rule stating that the computed order of the second actions cannot be regarded as an order of actions performed by a person. As this is similar to the case of the first heuristic rule, it is not described here in more detail.

Lastly, in operation 334, the processor unit 130 may generate user behavior data by using the one or more locations following the line of movement, the one or more first actions following the line of movement, and the one or more second actions performed at the final location, for all of the intentions.

To be more specific, the processor unit 130 can use the information above to generate script data, which may be intermediate data for the user behavior data, and can use the generated script data to generate the user behavior data as time series data in a table form. That is, the processor unit 130 can read the script data row by row and can generate the user behavior data in the form of a corresponding time series table.

Figure 8A:
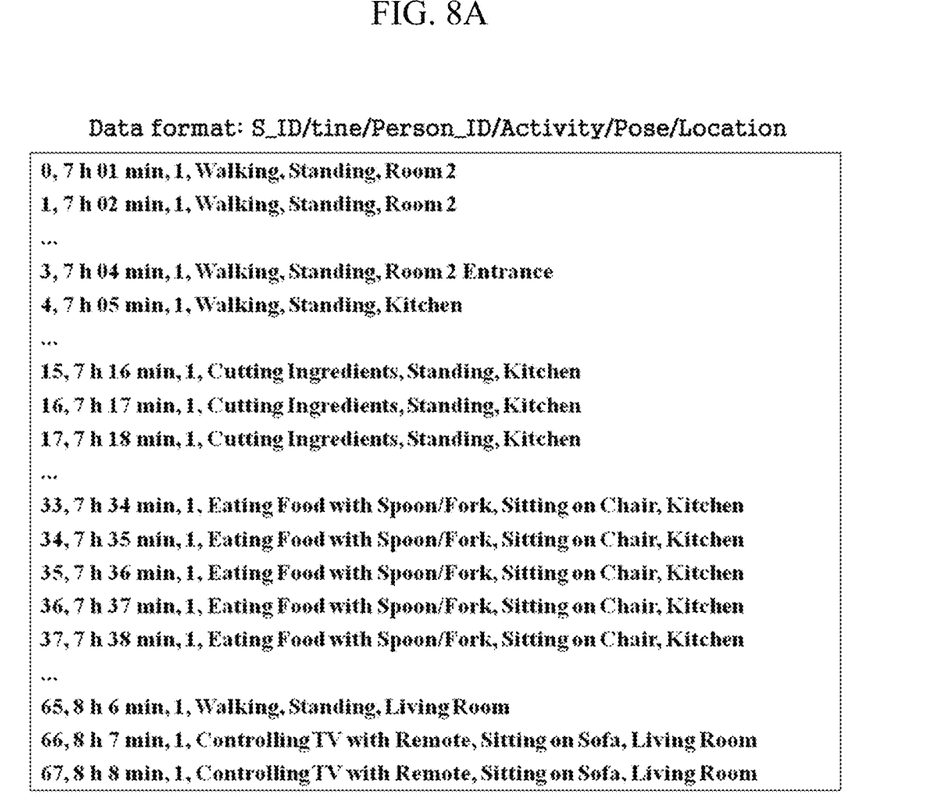
FIG. 8A and FIG. 8B illustrate examples of script data and user behavior data according to an embodiment of the invention.
Figure 8B:
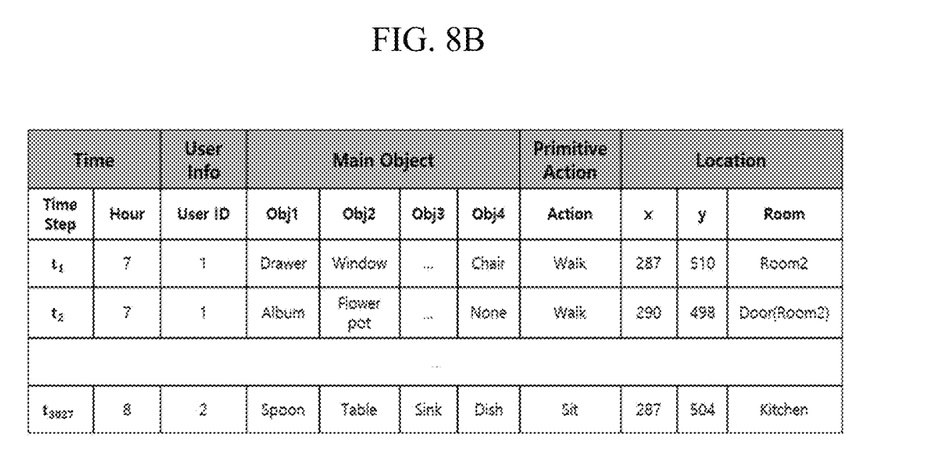

FIG. 8A illustrates an example of script data, and FIG. 8B illustrates an example of user behavior data.

Referring to FIGS. 8A and 8B, the format of the script data may include S_ID (relative time), hour, minute, person ID, action, posture, and location. Each row of data of the script data may be converted into user behavior data of a table form through a converter of the script data.

The table form of user behavior data may include information related to time, as well as information on the object, action and posture, and position. Here, 'TimeStep' represents time information measured according to a unit time period (e.g. units of seconds) from the beginning to the end of an intention, while 'Hour' represents time information changing with the passage of time from the starting time information received from the script data as measured in units of hours. Also, 'User ID' refers to the ID of the users, and "Main Object" represents information on the object detected according to the obtained line of movement and action information during an intention occurrence. Here, an object may be detected dependent on the specific locations within the virtual home plan structure. Also, 'Primitive Action' represents information on the action or posture occurring within the intention, and 'Location' represents information on the 2-dimensional coordinates (x, y) in the virtual space and the specific position corresponding thereto.

In short, an embodiment of the invention may analyze the behavioral pattern of a user for a day to generate a probability distribution model (e.g. a Gaussian mixture probability distribution model) and, using this, may automatically generate data composing the action and intention order corresponding to a specific selected time period during the day. In the case of order (sequence) data associated with locations, the common parts of the movement paths between locations for the users may be collected and reconstructed as movement paths on a preselected virtual map to generate information on lines of movement. Also, the user behavior data generated according to an embodiment of the invention may include intention information, location information, action information regarding an action occurring at each time point, and information regarding objects.

Certain embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A terminal device comprising:
a memory unit storing instructions readable by a computer; and
a processor unit implemented to execute the instructions,
wherein the processor unit is configured to
compute a probability distribution model for achieving intentions of a user by using raw data related to time-dependent actions of the user and
generate user behavior data by using the probability distribution model, the user behavior data comprising time series data in which a plurality of actions composing the intentions of the user are aligned in order,
wherein each of the plurality of actions belong to either one type of a first action or a second action, the first action being an action related to a movement between locations where the user is positioned, the second action being an action for achieving the intention, and each of the intentions is achieved by performing one or more of the first actions to move between one or more locations and then performing one or more of the second actions at a final location of the one or more locations,
wherein the probability distribution model comprises a first probability distribution model and a second probability distribution model, the first probability distribution model corresponding with information on an occurrence probability of the intention with respect to time, the second probability distribution model corresponding with occurrence information of the one or more second actions with respect to time at the final location, and
wherein the processor unit is configured to:

compute an order of the intentions by using the first probability distribution model;
compute a line of movement for each of the intentions according to the computed order of the intentions and computes the one or more first actions related to a movement between one or more locations according to the line of movement;
compute the one or more second actions performed at a final location of the line of movement for each of the intentions by using the second probability distribution model; and
generate the user behavior data by using the one or more locations associated with the line of movement, the one or more first actions associated with the line of movement, and the one or more second actions at the final location, for all of the intentions.

2. The terminal device of claim 1, wherein, when the computed order of the intentions does not satisfy a first heuristic rule, the processor unit is configured to re-compute the order of the intentions, the first heuristic rule being a preconfigured rule stating that the computed order of the intentions cannot be regarded as an order of intentions performed by a person.

3. The terminal device of claim 1, wherein, when the computed one or more second actions do not satisfy a second heuristic rule, the processor unit is configured to re-compute the one or more second actions, the second heuristic rule being a preconfigured rule stating that an order of the two or more second actions cannot be regarded as actions performed by a person.

4. The terminal device of claim 1, wherein the processor unit is configured to compute a line of movement for each of the intentions by computing a movement path of an initial location of the line of movement, a final location of the line of movement, and one or more locations following the line of movement.

5. The terminal device of claim 4, wherein the process path is configured to compute a movement path of the one or more locations for each of the intentions by using a virtual map having a graph form, the virtual map comprises nodes and an edge, the nodes corresponding to locations where the user is positioned, the edge connecting the nodes, and the edge is assigned an edge value as a probability of movement from one node to another node.

6. The terminal device of claim 5, wherein
an initial location of an i-th line of movement from among the lines of movement for the intentions corresponds to a final location of an (i-1)-th line of movement,
the processor unit is configured to compute a final location of the line of movement for each of the intentions by way of a probabilistic random selection of candidate locations, the candidate locations having assigned thereto computation probabilities of final locations, and
the processor unit computes a movement path of one or more locations following the line of movement by using edge values of edges connecting all nodes of the map.

7. The terminal device of claim 6, wherein the processor unit is configured to compute the movement path of the one or more locations by a probabilistic random selection of edge values of edges connecting the nodes of the map.

8. A method for generating user behavior data, the method performed at a terminal device comprising a processor unit, the method comprising:
computing a probability distribution model for achieving intentions of a user by using raw data related to time-dependent actions of the user; and
generating the user behavior data by using the probability distribution model, the user behavior data comprising time series data in which a plurality of actions composing the intentions of the user are aligned in order,
wherein each of the plurality of actions belong to either one type of a first action or a second action, the first action being an action related to a movement between locations where the user is positioned, the second action being an action for achieving the intention, and each of the intentions is achieved by performing one or more of the first actions to move between one or more locations and then performing one or more of the second actions at a final location of the one or more locations,
wherein the probability distribution model comprises a first probability distribution model and a second probability distribution model, the first probability distribution model corresponding with information on an occurrence probability of the intention with respect to time, the second probability distribution model corresponding with occurrence information of the one or more second actions with respect to time at the final location, and
wherein the processor unit:
computes an order of the intentions by using the first probability distribution model;
computes a line of movement for each of the intentions according to the computed order of the intentions and computes the one or more first actions related to a movement between one or more locations according to the line of movement;
computes the one or more second actions performed at a final location of the line of movement for each of the intentions by using the second probability distribution model, and
generates the user behavior data by using the one or more locations associated with the line of movement, the one or more first actions associated with the line of movement, and the one or more second actions at the final location, for all of the intentions.

9. A non-transitory computer readable recording medium, the recording medium having recorded thereon a program of instructions for executing a method for generating user behavior data, the method performed at a terminal device comprising a processor unit, wherein the method comprises:
computing a probability distribution model for achieving intentions of a user by using raw data related to time-dependent actions of the user; and
generating the user behavior data by using the probability distribution model, the user behavior data comprising time series data in which a plurality of actions composing the intentions of the user are aligned in order,
wherein each of the plurality of actions belong to either one type of a first action or a second action, the first action being an action related to a movement between locations where the user is positioned, the second action being an action for achieving the intention, and each of the intentions is achieved by performing one or more of the first actions to move between one or more locations and then performing one or more of the second actions at a final location of the one or more locations,
wherein the probability distribution model comprises a first probability distribution model and a second probability distribution model, the first probability distribution model corresponding with information on an occurrence probability of the intention with respect to time, the second probability distribution model corresponding with occurrence information of the one or more second actions with respect to time at the final location, and wherein the processor unit:
- computes an order of the intentions by using the first probability distribution model;
- computes a line of movement for each of the intentions according to the computed order of the intentions and computes the one or more first actions related to a movement between one or more locations according to the line of movement;
- computes the one or more second actions performed at a final location of the line of movement for each of the intentions by using the second probability distribution model, and generates the user behavior data by using the one or more locations associated with the line of movement, the one or more first actions associated with the line of movement, and the one or more second actions at the final location, for all of the intentions.

* * * * *